United States Patent [19]

Fuller

[11] Patent Number: 4,993,731
[45] Date of Patent: Feb. 19, 1991

[54] MOTORCYCLE QUICK RELEASE SISSY BAR BRACKET

[76] Inventor: Wyatt S. Fuller, 6289 NW. 62nd Ter., Parkland, Fla. 33067

[21] Appl. No.: 409,599

[22] Filed: Sep. 19, 1989

[51] Int. Cl.⁵ .............................................. B62J 1/28
[52] U.S. Cl. ............................. 280/202; 280/288.4; 280/304.4; 297/352; 297/DIG. 9; 403/111; 403/317; 403/327
[58] Field of Search ............ 280/202, 280, 227, 288.4, 280/290, 304.3, 304.4, 304.5; 180/219; 297/352, 195, 375, DIG. 9; 224/31, 32 R, 32 A, 30 R; 403/83, 111, 343, 327, 316, 317, 353

[56] References Cited

U.S. PATENT DOCUMENTS

| | | | |
|---|---|---|---|
| 3,791,563 | 2/1974 | Raat | 224/31 |
| 3,850,353 | 11/1974 | Foulds | 224/31 |
| 4,030,750 | 6/1977 | Abram | 297/375 |
| 4,032,189 | 6/1977 | Benavente et al. | 297/352 |
| 4,051,985 | 10/1977 | Berger | 403/353 |
| 4,111,448 | 9/1978 | Sklodowsky | 280/202 |
| 4,244,496 | 1/1981 | Litz | 224/32 A |
| 4,466,660 | 8/1984 | Mabie | 297/195 |
| 4,470,716 | 9/1984 | Welch | 403/316 |
| 4,473,316 | 9/1984 | Welch | 403/353 |
| 4,630,982 | 12/1986 | Fenner | 403/353 |
| 4,673,190 | 6/1987 | Ahlberg | 280/289 |

Primary Examiner—Charles A. Marmor
Assistant Examiner—A. M. Boehler
Attorney, Agent, or Firm—Oltman and Flynn

[57] ABSTRACT

In accordance with the invention, there is provided a quick release sissy bar bracket for a motorcycle having a rear fender bar on each side of the rear fender, which is rigidly attached to the motorcycle, and a sissy bar bracket plate releasably attachable to each fender bar; a forward coupling arrangement in the form of coupling bolts is rigidly attached to said rear fender bar, and a forward receiving arrangement is rigidly attached to the bracket plate for releasably receiving said forward coupling bolts and rear coupling bolts which are rigidly attached to the rear fender bar, spaced apart from the forward coupling bolts, and a rear receiving arrangement is rigidly attached to the bracket plate for releasably receiving the rear coupling bolt. A spring biased locking means in engagement with at least one of said forward and rear receiving arrangements on each bracket plate serves for releasably locking the receiving arrangement to the coupling bolts.

6 Claims, 3 Drawing Sheets

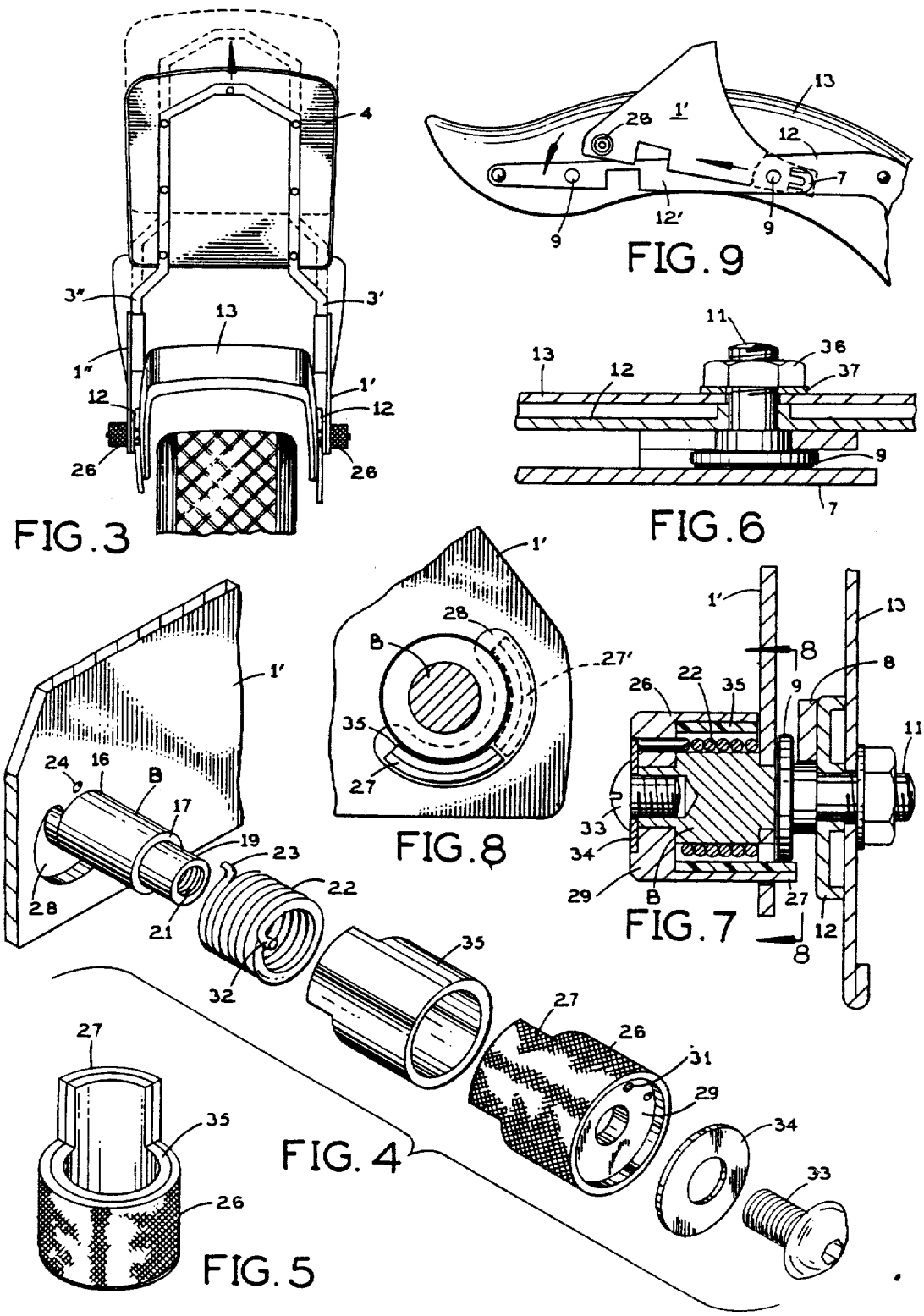

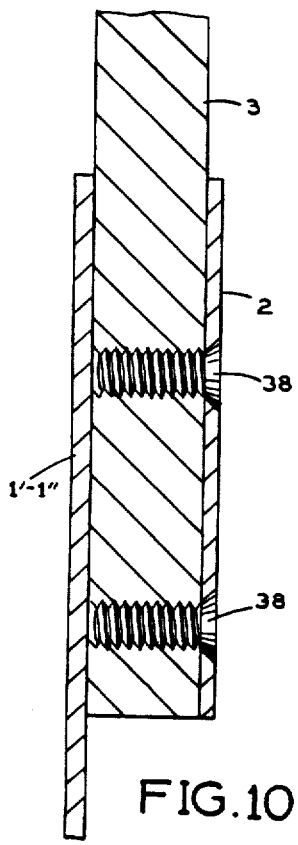
FIG. 10
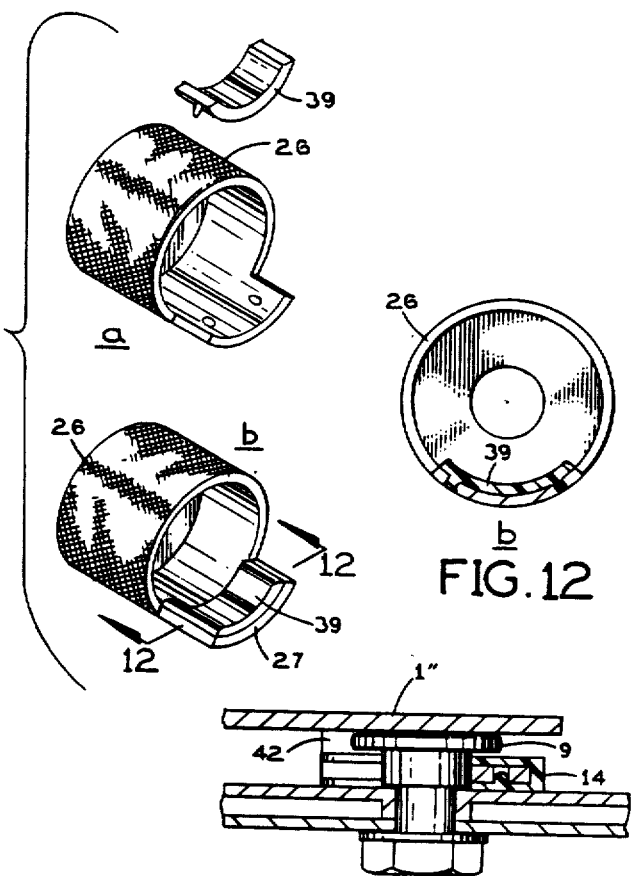
FIG. 11
FIG. 12
FIG. 15
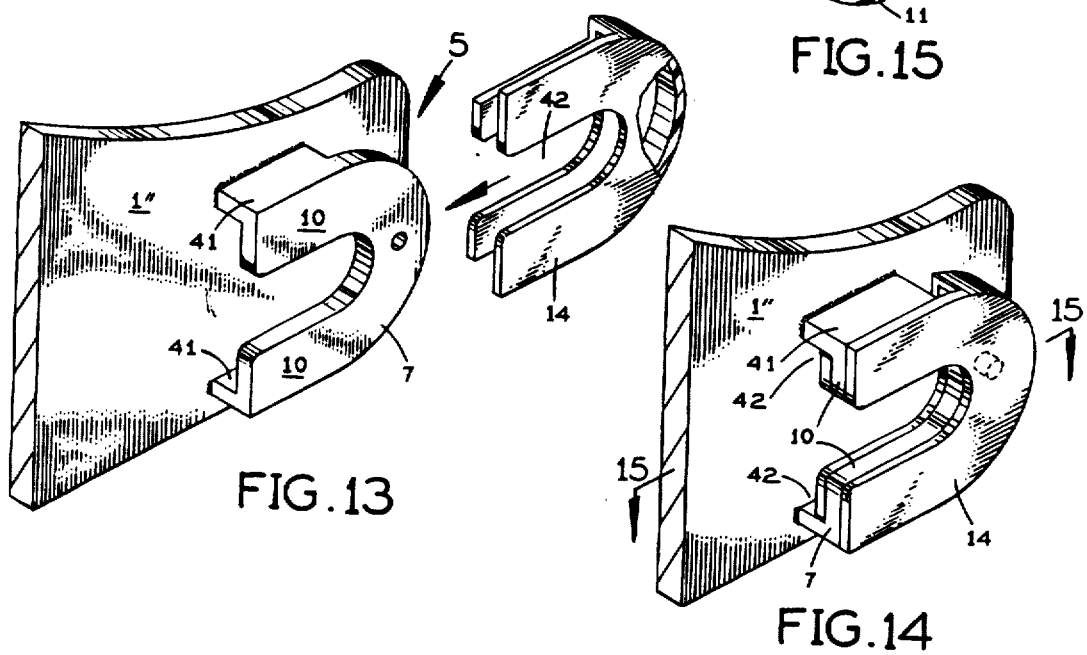
FIG. 13
FIG. 14

MOTORCYCLE QUICK RELEASE SISSY BAR BRACKET

BACKGROUND AND PRIOR ART

The invention relates to a bracket for holding a so-called sissy bar attached to the rear of a motorcycle.

A sissy bar is a bar attached to the back of a motorcycle seat to act as a restraint/backrest for the passenger.

Although most motorcycles make some provisions for a sissy bar, many of the purchasers prefer the clean look of the motorcycle without the sissy bar, but mount them anyway for convenience, even though they would like to have some way to remove them when not needed. This is especially true with owners of Harley Davidson motorcycles many of whom use their motorcycles for show purposes.

The object of the instant invention is to provide a sissy bar bracket that allows quick installation of the sissy bar and quick removal when it is not desired, such as for showing the motorcycle.

It is a further object to provide a sissy bar bracket that can be readily installed or removed without use of tools and which does not require mounting of components or parts on the motorcycle that may detract from its desirable appearance and do not mar or scratch the finish of any fixed parts of the motorcycle.

Inventors have in the past disclosed various forms of back rests for sissy bars that are adjustable or removable.

U.S. Pat. No. 4,030,750 shows a sissy bar for a motorcycle having a movable portion so that a single or two riders can be accommodated on the cycle. U.S. Pat. No. 4,032,189 shows a longitudinally adjustable back rest that can be readily be removed from a U-shaped frame secured to the base portion of the seat.

The sissy bars and back rests of the known art have the disadvantage that they are not readily removable and that they require attachment to the motor cycle in such a way that the "clean" appearance of the motorcycle, as desired for showing, is somewhat inpaired.

SUMMARY OF THE INVENTION

In accordance with the invention, there is provided a quick release sissy bar bracket for a motorcycle having a rear fender bar on each side of the rear fender, which is rigidly attached to the motor cycle, and a sissy bar bracket plate releasably attachable to each fender bar; a forward coupling arrangement in the form of coupling bolts rigidly attached to said rear fender bar, and a forward receiving arrangement rigidly attached to the bracket plate for releasably receiving said forward coupling bolts and rear coupling bolts which are rigidly attached to the rear fender bar, spaced apart from the forward coupling bolts, and a rear receiving arrangement rigidly attached to the bracket plate for releasably receiving the rear coupling bolt. A spring biased locking means in engagement with at least one of said forward and rear receiving arrangements on each bracket plate serves for releasably locking the receiving arrangement to the coupling bolts. In accordance with a further feature, there is provided a quick release sissy bar bracket wherein at least one of said forward and rear coupling bolts is a shoulder bolt having an extended bolt head.

In accordance with a still further feature there is provided a quick release sissy bar bracket, wherein said extended bolt head extends radially away from said shoulder bolt.

In accordance with still another feature, there is provided a quick release sissy bar bracket, wherein the extended bolt head faces away from the motor cycle, and wherein each of the receiving arrangements includes a U-shaped holding member, which is spaced apart from the bracket plate, forming a receiving space between said U-shaped member and said bracket plate for receiving the head of the shoulder bolt. There may further be provides a quick release sissy bar wherein each of the U-shaped members has a pair of parallel legs, wherein the pairs of legs are perpendicular to each other.

According to another feature of the invention, in the quick release sissy bar according to the invention, one of the pairs of legs of the rear receiving arrangement are facing downward and said pair of legs perpendicular thereto are facing the rear receiving arrangement, and further still, the spring biased locking arrangement is in operative engagement with the downward-facing pair of legs.

In one presently preferred embodiment of the invention there is provided a quick release sissy bar wherein the springbiased locking arrangement includes a locking cam having a locking position for retaining the extended head of the coupling bolt in said receiving arrangement and an unlocking position; a spring in engagement with the locking cam for urging the locking cam into the locking position, and a handle for manually moving the locking cam away from the locking position, and which further includes a locking bolt attached at one end perpendicularly to one side of the bracket plate facing away from the U-shaped member; a cut-out in the bracket plate for admitting the locking cam to the other side of the bracket plate; and wherein said handle is rotatable about the locking bolt for moving the locking cam away from said locking position.

A protective sleeve of soft material may be provided to be inserted over the heads of the shoulder bolts to prevent their finish foam being marred by the mounting or removal of the sissy bar brackets.

Further objects and advantages of this invention will be apparent from the following detailed description of a presently preferred embodiment which is illustrated schematically in the accompanying drawings.

BRIEF DESCRIPTION OF THE FIGURES

FIG. 3 is an elevational rear view of the invention showing the back rest attached to the bracket plates, seen along the line 3—3 of FIG. 2.

FIG. 4 is a detail perspective EXPLODED view showing the locking arrangement in exploded form;

FIG. 5 is an enlarged detail view showing a part of the locking arrangement with a locking cam.

FIG. 6 diagrammatic cross-sectional enlarged detail view at the receiving arrangement with a shoulder bolt, seen along the line 6—6 of FIG. 2;

FIG. 7 is a diagrammatic cross-sectional view showing the locking arrangement and a shoulder bolt, seen along the line 7—7 of FIG. 2

FIG. 8 is an elevational diagrammatic fragmentary detail view showing a cut-out with a locking cam in its locking position seen along the line 8—8 of FIG. 7;

FIG. 9 is an elevational view of the invention showing a right hand side bracket plate partially released;

FIG. 10 is a diagrammatic cross-sectional fragmentary, enlarged detail view, showing the sissy bar holder, seen along the line 10—10 of FIG. 2;

FIG. 11 is a perspective view showing parts of the locking arrangement;

FIG. 12 is a perspective view of a part of the locking arrangement;

FIG. 13 is a diagrammatic fragmentary detail perspective view showing the U-shaped member of the forward receiving arrangement with the protective sleeve removed;

FIG. 14 is a fragmentary perspective view showing the forward receiving arrangement with the protective sleeve inserted and;

FIG. 15 is a diagrammatic cross-sectional fragmentary view showing part of the forward receiving arrangement.

DESCRIPTION OF THE PREFERRED EMBODIMENTS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
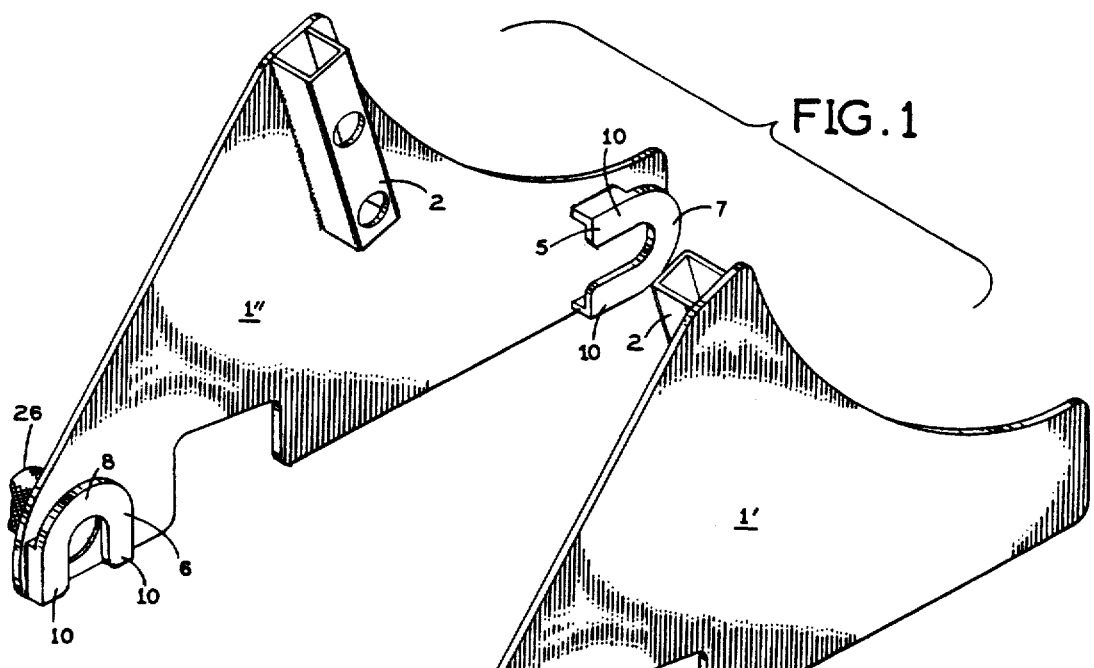
FIG. 1 is a perspective view of the invention showing two bracket plates facing each other.

FIG. 1 shows the main elements of the invention namely a left and right hand bracket plate 1' and 1" which are identical except that they are mirror-symmetrical about their center plane. With that in mind, corresponding parts are shown without the prime where not needed for clearness of the description. Where they are shown with prime the single prime refers to parts on the right hand side of the motorcycle, and the double prime refers to parts on the left hand side.

Figure 2:
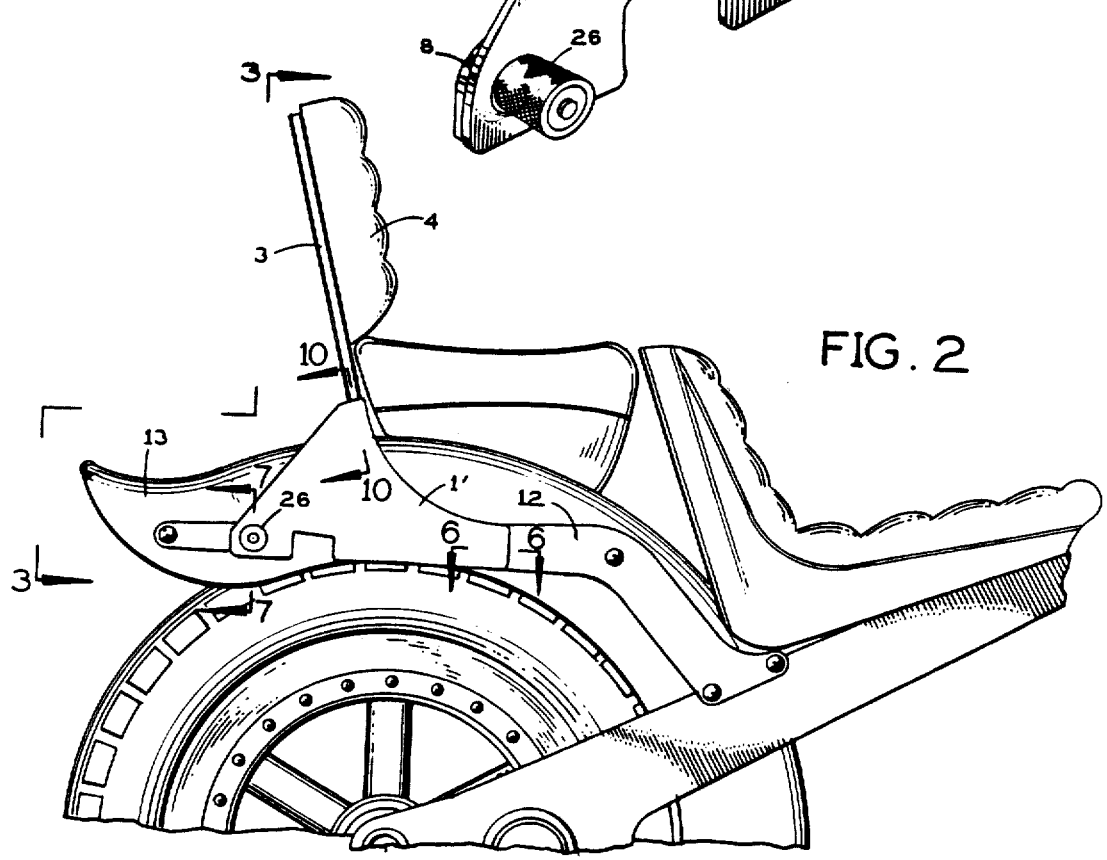
FIG. 2 is an elevational side view of the invention showing the bracket plates installed on a motor cycle.

Each bracket plate 1', 1" has a sissy holder 2, shaped to receive two side legs 3 of a back rest 4, seen in FIG. 2. Each bracket plate 1', 1" has on its inward facing side a forward receiving arrangement 5 and a rear receiving arrangement 6, each shaped as a U-member 7,8 rigidly attached to the plate with a given space between the U-member 7,8 and the plate 1', 1", which provides space for an extended bolt head 9 (FIG. 6 and 7) of a shoulder bolt 11, of which two are mounted at each side of the motorcycle on a rear fender bar 12 mounted on the motorcycle for supporting the rear fender 13, best seen in FIGS. 2, 3, 6, 7 and 9. The given space may be capable of also accommodating a protective sleeve 14, seen in FIGS. 13 and 14, that fits over the extended bolt head 9 of the corresponding shoulder bolt 11 to prevent marring of the finish of the bolt head.

The U-shaped members 7,8 are mounted on the plates 1', 1" such that one member, e.g. member 8 has its legs 10 of the "U" facing downward while the legs 10 of the other member 7 are facing toward the other member 8.

A locking arrangement is provided for securing the U-shaped member 8 with the downward facing legs to the extended bolt head 9. The details of the locking arrangement are shown in FIGS. 4,5,6,7,8 and 11. A locking bolt B, best seen in FIG. 4 is rigidly attached at one end 16 to the bracket plate 1', and has a shoulder 17 set back from the other end, which has a threaded end hole 21 formed therein. A helical spring 22 fits on the part of the locking bolt B between the shoulder 17 and the bracket plate 1', with the inner end 23 of the spring bent in axial direction to fit in a spring hole 24 in the bracket plate 1'. A cylindrical locking handle 26, with a knurled surface for better grasping, has an axially extending locking cam 27, and fits over the locking bolt 14 and the spring 22 with the locking 27 cam extending through a semi circular cutout 28 in the bracket plate 1'. A inward facing flange 29 of the locking handle 26 has at least one hole 31 for receiving the other bent end 32 of the spring 22. A retaining bolt 33 with a washer 34 fits in the threaded end hole 21 and serves to hold together the entire locking assembly shown in FIG. 4. A plastic sleeve 35 is shaped to match the form of the locking handle 26 and to fit in a space between the inside of the locking handle 26 and the outside of the spring 22. The plastic sleeve 35 serves to provide smooth non-friction operation of the locking handle 26. The spring 22 serves to urge the locking cam 27 into its locking position with the locking cam 27 facing downward as seen in FIG. 7 and 8 which shows the locking assembly including the shoulder bolt 11 with its extended head 9 locked into the space between the U-shaped member 8 and the bracket plate 1' by the locking cam 27. The locking arrangement is unlocked by grasping the knurled handle 26 and turning it a quarter turn against the spring force of spring 22 thereby providing an escape path for the extended head of shoulder bolt 11.

FIG. 8 is a section of FIG. 7 seen along the line 8—8 of FIG. 7 showing the semi circular cutout 28 with the locking cam 27 in the locking position seen in full lines and in the unlocking position 27', shown in phantom lines, which is offset a quarter turn from the locking position.

FIG. 5 is an oblique view of the locking handle 26 showing the locking cam 27, and the conforming plastic sleeve 35.

FIG. 6 shows details of the forward receiving arrangement 5 having a U-shaped member 7 with legs 10 facing rearward, and containing the extended head 9 of the forward sholder bolt 11, attached to the fender bar 12 by means of a nut 36 and washer 37.

FIG. 10 is a cross-section of the sissy bar holder 2 having the side bars 3 of the back rest 4 inserted therein and secured by screws.

FIG. 11 shows two views a and b of the locking handle 26, locking cam 27 and a plastic insert 39, which in this embodiment covers only the locking cam 27. FIG. 12 is a section seen along the line 12—12 of FIG. 11, view b.

FIGS. 13, 14 and 15 show further details of the forward receiving arrangement 5 with the U-shaped member 7 and spacers 41 welded to bracket plate 1". A protective plastic sleeve 14, mentioned above, is shaped to fit in the space between the U-shaped member 7 and the bracket plate 1", and yet leave space 42 to allow the extended head 9 of the shoulder bolt 11 to slide into the space 42 when the bracket plate 1" is installed, as seen in FIG. 2. FIG. 15 is a cross-section seen along the line 15—15 of FIG. 14, showing the extended head 9 of shoulder bolt 11 disposed in the space 42 between the protective sleeve 14 and the surface of bracket plate 1".

I claim:

1. A quick release sissy bar bracket for a motorcycle having a rear fender bar rigidly attached to the motorcycle on each side of a rear fender, comprising: a sissy bar bracket plate releasably attachable to each fender bar; forward coupling means rigidly attached to said rear fender bar and forward receiving means rigidly attached to said bracket plate for releasably receiving said forward coupling means; rear coupling means rigidly attached to said rear fender bar spaced apart from said forward coupling means, and rear receiving means rigidly attached to said bracket plate for releasably receiving said rear coupling means; at least one of said forward and rear coupling means being a shoulder bolt having an extended head; each of said receiving means including a U-shaped holding member spaced apart from said bracket plate, forming a receiving space between said U-shaped member and said bracket plate for receiving the extended head of said shoulder bolt; and each of said U-shaped members having a pair of parallel legs, said pairs of legs being perpendicular to each other.

2. Quick release sissy bar bracket according to claim 1, wherein said pair of legs of said rear receiving means are facing downward and said pair of legs perpendicular thereto are facing said rear receiving means.

3. Quick release sissy bar bracket according to claim 2, wherein said spring biased locking means are in operative engagement with said downward facing legs.

4. A quick release sissy bar bracket for a motorcycle having a rear fender bar rigidly attached to the motorcycle on each side of a rear fender, comprising: a sissy bar bracket plate releasably attachable to each fender bar; forward coupling means rigidly attached to said rear fender bar and forward receiving means rigidly attached to said bracket plate for releasably receiving said forward coupling means; rear coupling means rigidly attached to said rear fender bar spaced apart from said forward coupling means, and rear receiving means rigidly attached to said bracket plate for releasably receiving said rear coupling means; and spring-biased locking means in operative engagement with at least one of said forward and rear receiving means on each bracket plate for releasably locking said receiving means to said coupling means, said spring-biased locking means including a locking cam having a locking position for retaining said coupling means in said receiving means and an unlocking position, a spring in engagement with said locking can for urging said locking cam into said locking position, and a handle for manually moving said locking cam away from said locking position.

5. Quick release sissy bar bracket according to claim 4, including a locking bolt attached at one end perpendicularly to one side of said bracket plate facing away from said U-shaped member; a cut-out in said bracket plate for admitting said locking cam to the other side of said bracket plate, wherein said handle is rotatable about said locking bolt for moving said locking cam away from said locking position.

6. Quick release sissy bar according to claim 5, wherein said handle has a knurled surface for grasping the handle.

* * * * *